US012269496B2

(12) United States Patent
Cha et al.

(10) Patent No.: US 12,269,496 B2
(45) Date of Patent: Apr. 8, 2025

(54) APPARATUS FOR AND METHOD OF TRANSFERRING VEHICLE COMMUNICATION CONTENT

(71) Applicant: HYUNDAI MOBIS CO., LTD., Seoul (KR)

(72) Inventors: Jun Hyuk Cha, Yongin-si (KR); Seung Woo Baek, Yongin-si (KR); Ban Suk Choi, Yongin-si (KR); Hyoung Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 256 days.

(21) Appl. No.: 18/047,034

(22) Filed: Oct. 17, 2022

(65) Prior Publication Data

US 2023/0166753 A1 Jun. 1, 2023

(30) Foreign Application Priority Data

Nov. 29, 2021 (KR) .................. 10-2021-0166920

(51) Int. Cl.
*B60W 50/14* (2020.01)
*B60Q 1/50* (2006.01)
(Continued)

(52) U.S. Cl.
CPC ............ *B60W 50/14* (2013.01); *B60Q 1/525* (2013.01); *B60Q 5/006* (2013.01); *G07C 5/008* (2013.01); *B60W 2050/146* (2013.01); *B60W 2520/12* (2013.01); *B60W 2540/225* (2020.02); *B60W 2554/4041* (2020.02); *B60W 2554/4049* (2020.02)

(58) Field of Classification Search
None
See application file for complete search history.

(56) References Cited

U.S. PATENT DOCUMENTS 10,232,713 B2 * 3/2019 Kim .................. G08G 1/166
10,235,879 B2 * 3/2019 Im ..................... G08G 1/0962
(Continued)

FOREIGN PATENT DOCUMENTS

KR 10-1908308 10/2018

OTHER PUBLICATIONS

English Language Abstract of KR 10-1908308 published Oct. 16, 2018.

*Primary Examiner* — Todd Melton
(74) *Attorney, Agent, or Firm* — DLA PIPER LLP US

(57) ABSTRACT

A method of transferring vehicle communication content. The apparatus includes a surrounding-environment detection unit configured to detect a surrounding-environment information of a vehicle, a communication content transfer unit provided on at least one of a front side, a rear side, and a lateral side of the vehicle and configured to output sound or light; and a controller configured to recognize an object on the basis of the surrounding-environment information of the vehicle, to rotate the communication content transfer unit in a direction toward the object, depending on whether or not communication content needs to be transferred to the recognized object, and to output the communication content containing warning information or guide information through the communication content transfer unit.

12 Claims, 5 Drawing Sheets

(51) Int. Cl.
  *B60Q 5/00*   (2006.01)
  *G07C 5/00*   (2006.01)

(56) References Cited

U.S. PATENT DOCUMENTS

| | | | |
|---|---|---|---|
| 10,497,255 B1* | 12/2019 | Shmueli Friedland | ................... G05D 1/0088 |
| 10,611,293 B2* | 4/2020 | Park | ................... B60Q 1/143 |
| 11,104,269 B2* | 8/2021 | Karol | ................ B60W 60/0011 |
| 11,458,891 B1* | 10/2022 | Kuehner | ................ H04R 1/323 |
| 11,794,643 B2* | 10/2023 | Braeuchle | .............. B60Q 9/008 |
| 2011/0199199 A1* | 8/2011 | Perkins | ................. B60Q 1/525 340/435 |
| 2016/0090038 A1* | 3/2016 | Briggs | ................. B60Q 1/525 340/435 |

* cited by examiner

APPARATUS FOR AND METHOD OF TRANSFERRING VEHICLE COMMUNICATION CONTENT

CROSS-REFERENCE TO RELATED APPLICATION

This application claims priority from and the benefit of Korean Patent Application No. 10-2021-0166920, filed on Nov. 29, 2021, which is hereby incorporated by reference for all purposes as if set forth herein.

BACKGROUND

Field

The present disclosure relates to an apparatus for and a method of transferring vehicle communication content and, more particularly, to an apparatus for and a method of transferring vehicle communication content, the apparatus and the method being capable of directly communicating with a communication-target object using an integrated module, in which a sound function and a lighting function are combined, provided one at least on one of a front side, a rear side, and a lateral side of a vehicle.

Discussion of the Background

Usually, a vehicle is equipped with a vehicle lamp having an illuminating function of easily checking whether or not an object is positioned in the vicinity of the vehicle while traveling in night and a signaling function of alerting another vehicle or a pedestrian on a road to a traveling state of the vehicle.

For example, in addition to a vehicle lamp that operates using a direct light emitting technique, a reflector that operates using a light reflecting technique, and the like are mounted on front and rear sides of the vehicle. The vehicle lamps include a headlamp emitting light in a forward direction for securing a driver's view, a brake lamp emitting light when depressing a brake pedal, a turn signal lamp being used when making a right or making a left, and a backup lamp flickering when backing up the vehicle. The reflector reflects light in such a manner that a host vehicle can be easily recognized from the outside.

As described above, the lamps mounted on front and rear sides of the vehicle serve to alert the outside to a driver's intention (communication content).

However, in the related art, the use of only lighting to transfer the driver's intention imposes a limitation on information transmission and visual recognition, depending on a surrounding environment (for example, weather, a decrease in light recognizability in the daytime, a bad condition of a road surface, a road in the fog, and the like).

In addition, in a case where communication is performed using lighting and sound, a target for communication is not specified, and this may cause confusion in transferring the driver's intention. In addition, in a typical road situation, there is a high likelihood that lighting and sound will become light pollution and noise that have an unpleasant effect on an object other than the target for communication.

An example of the related art is Korean Patent No. 1908308 registered on Oct. 10, 2018 entitled "Lamp for Vehicle".

SUMMARY

An object of the present disclosure, which is made to solve the above-mentioned problems, is to provide an apparatus for and a method of transferring vehicle communication content, being capable of directly communicating with a communication-target object using an integrated module, in which a sound function and a lighting function are combined, provided on at least on one of a front side, a rear side, and a lateral side of a vehicle.

The present disclosure is not limited to the above-mentioned object, and from the following description, an object not mentioned would be clearly understandable to a person of ordinary skill in the art.

According to an aspect of the present disclosure, there is provided an apparatus for transferring vehicle communication content, the apparatus including: a surrounding-environment detection unit configured to detect a surrounding-environment information of a vehicle; a communication content transfer unit provided on at least one of a front side, a rear side, and a lateral side of the vehicle and configured to output sound or light; and a controller configured to recognize an object on the basis of the surrounding-environment information of the vehicle, to rotate the communication content transfer unit in a direction toward the object, depending on whether or not communication content needs to be transferred to the recognized object, and to output the communication content containing warning information or guide information through the communication content transfer unit.

In the apparatus, the communication content transfer unit may include: an object detection unit configured to identify a type of the object; a speaker unit configured to output the communication content in the form of a sound wave; and a lighting unit configured to output the communication content in the form of light.

In the apparatus, the object detection unit may identify the type of the object and, under the control of the controller, may follow the object.

In the apparatus, the speaker unit may be realized as a directional speaker that uses an ultrasonic wave technique and, under the control of the controller, may output sound corresponding to the communication content.

In the apparatus, the lighting unit may include a plurality of light sources and may be turned on or flicker under the control of the controller, thereby emitting the light corresponding to the communication content to a road surface.

In the apparatus, the communication content transfer unit may be provided in a rotatable manner and, under the control of the controller, may be rotated in such a manner as to face toward the object, and each of the communication content transfer units may be driven independently under the control of the controller and may output sound or light.

In the apparatus, the surrounding-environment information of the vehicle may include at least one of ambient lighting, noise, weather information, a type of road, a lane width, a position of a surrounding object, a distance thereto, and a speed thereof, and the controller may adjust a sound volume of the speaker unit and light intensity or an angle of each light source provided in the lighting unit, considering the surrounding-environment information of the vehicle.

In the apparatus, the controller may determine on the basis of a type of the object and a distance thereto whether or not the communication content needs to be transferred to the object, and in a case where the object is an object that needs to maintain a preset sight distance and where the object is positioned at a predetermined distance or smaller, the controller may determine that the communication content needs to be transferred to the object.

In the apparatus, in a case where the object approaches in a manner that is positioned at a preset first distance or smaller, on the basis of the surrounding-environment information of the vehicle, the controller may output the warning information for alerting that a distance to the vehicle is equal to or smaller than the preset first distance, through a speaker unit of the communication content transfer unit, in a case where the object approaches in a manner that is positioned at a preset second distance or smaller, on the basis of the surrounding-environment information of the vehicle, the controller may stop the vehicle and may output the guide information for urging the object to keep a lookout, through the speaker unit and a lighting unit of the communication content transfer unit, and in a case where the object moves in a manner that is positioned at a preset threatening approach distance or greater, on the basis of the surrounding-environment information of the vehicle, the controller may perform control in such a manner that the vehicle starts to travel.

According to another aspect of the present disclosure, there is provided a method of transferring vehicle communication content, the method including: receiving, by a controller, surrounding-environment information of a vehicle; recognizing, by the controller, an object on the basis of the surrounding-environment information of the vehicle and determining, by the controller, whether or not communication content needs to be transferred to the recognized object; and rotating, by the controller, a communication content transfer unit in a direction toward the object in a case where the communication content needs to be transferred to the object and outputting, by the controller, the communication content containing warning information or guide information through the communication content transfer unit.

In the method, in the determining by the controller of whether or not the communication content needs to be transferred to the recognized object, in a case where the object is an object that needs to maintain a preset sight distance and is positioned at a predetermined distance or smaller, the controller may determine that the communication content needs to be transferred to the object.

In the method, in the outputting by the controller of the communication content through the communication content transfer unit, in a case where the object approaches in a manner that is positioned at a preset first distance or smaller, on the basis of the surrounding-environment information of the vehicle, the controller may output the warning information for alerting that a distance to the vehicle is equal to or smaller than the preset first distance, through a speaker unit of the communication content transfer unit, in a case where the object approaches in a manner that is positioned at a preset second distance or smaller, on the basis of the surrounding-environment information of the vehicle, the controller may stop the vehicle and may output the guide information for urging the object to keep a lookout, through the speaker unit and a lighting unit of the communication content transfer unit, and in a case where the object moves in a manner that is positioned at a preset threatening approach distance or greater, on the basis of the surrounding-environment information of the vehicle, the controller may perform control in such a manner that the vehicle starts to travel.

In the method, in the outputting by the controller of the communication content through the communication content transfer unit, the controller may adjust a sound volume of the speaker unit and light intensity or an angle of each light source provided in the lighting unit, considering the surrounding-environment information including at least one of ambient lighting, noise, weather information, a type of road, a lane width, a position of a surrounding object, a distance thereto, and a speed thereof.

As described above, in the apparatus for and the method of transferring vehicle communication content according to the aspects, respectively, of the present disclosure, direct communication with a communication-target object is possible through an integrated module in which a directional sound function and a lighting function are combined. Thus, in a situation where a vehicle travels at a low speed or comes to a stop, the risk of an accident due to a collision with a pedestrian or a two-wheeled vehicle can be prevented.

In addition, in the apparatus for and the method of transferring vehicle communication content according to the aspects, respectively, of the present disclosure, an actuator is provided in an integrated module in which the directional sound function and the lighting function are combined, and the integrated module is rotated in such a manner as to face toward a communication-target object. Accordingly, information, such as communication content, is transferred, considering a movement of a target object and a direction of gaze thereof (recognized by a camera). Thus, the product's marketability can be enhanced, and the product's visual recognizability can be improved.

The present disclosure is not limited to the advantageous effects mentioned above, and various advantages that, from the following description, are obvious to a person of ordinary skill in the art would fall within the scope of the present disclosure.

DETAILED DESCRIPTION OF THE ILLUSTRATED EMBODIMENTS

Figure 1:
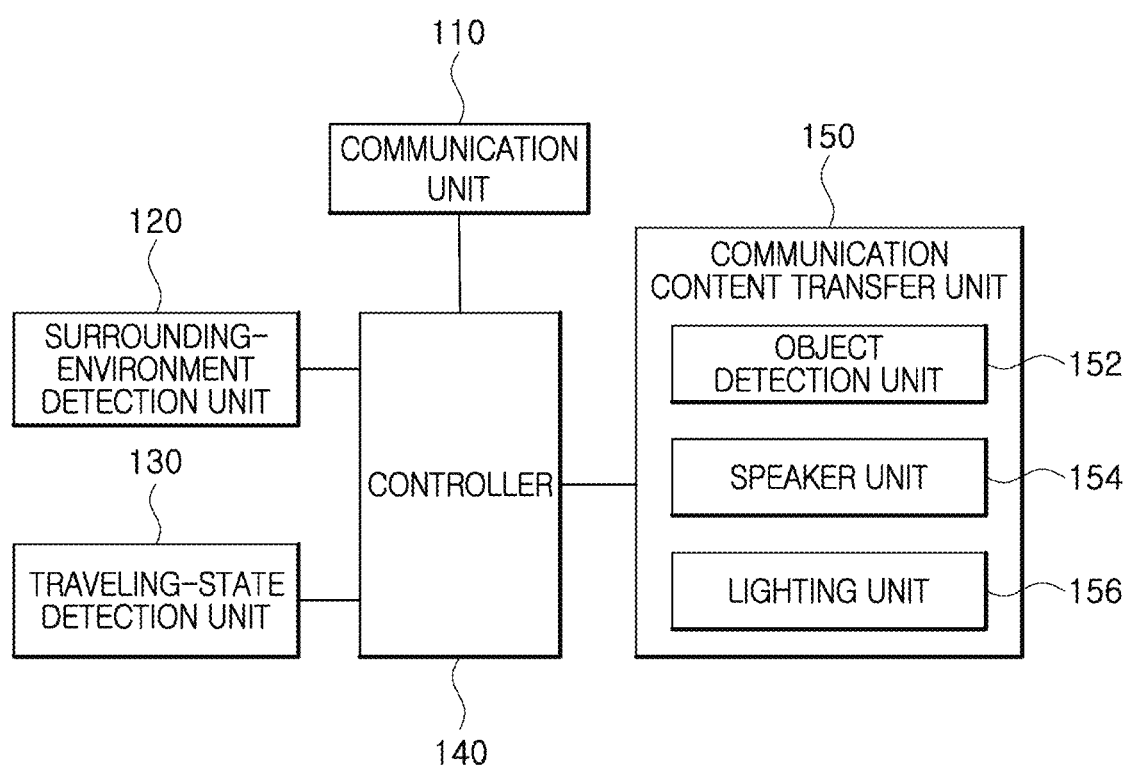
FIG. 1 is a block diagram schematically illustrating an apparatus for transferring vehicle communication content according to a first embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

An apparatus for and a method of transferring vehicle communication content according to first and second embodiments, respectively, of the present disclosure will be described in detail below with reference to the accompanying drawings. For clarity and convenience in description, thicknesses of lines, sizes of constituent elements, and the like are illustrated in a larger size in non-exact proportion in the drawings. In addition, a term defined by considering the meaning thereof in the present disclosure will be used below and may vary according to the user's or manager's intention or to practices in the art. Therefore, the term should be defined in context in light of the present specification.

A physical realization described in the present disclosure may be, for example, in the form of a method, a process, an apparatus, a software program, a data stream, or a signal. The physical realization, although described contextually as only in a single form (for example, described as only in the form of a method) may also be in a different form (for example, in the form of an apparatus or a program). The apparatus may be realized in the form of adequate hardware, software, firmware, or the like. The method, for example, may be realized in an apparatus, such as a computer, a microprocessor, or a processor that generally refers to a processing device, such as an integrated circuit or a programmable logic device. The apparatuses also include a computer, a cellular phone, a portable/personal digital assistant (PDA), and other communication devices that facilitate communication of information between end users.

Figure 2:
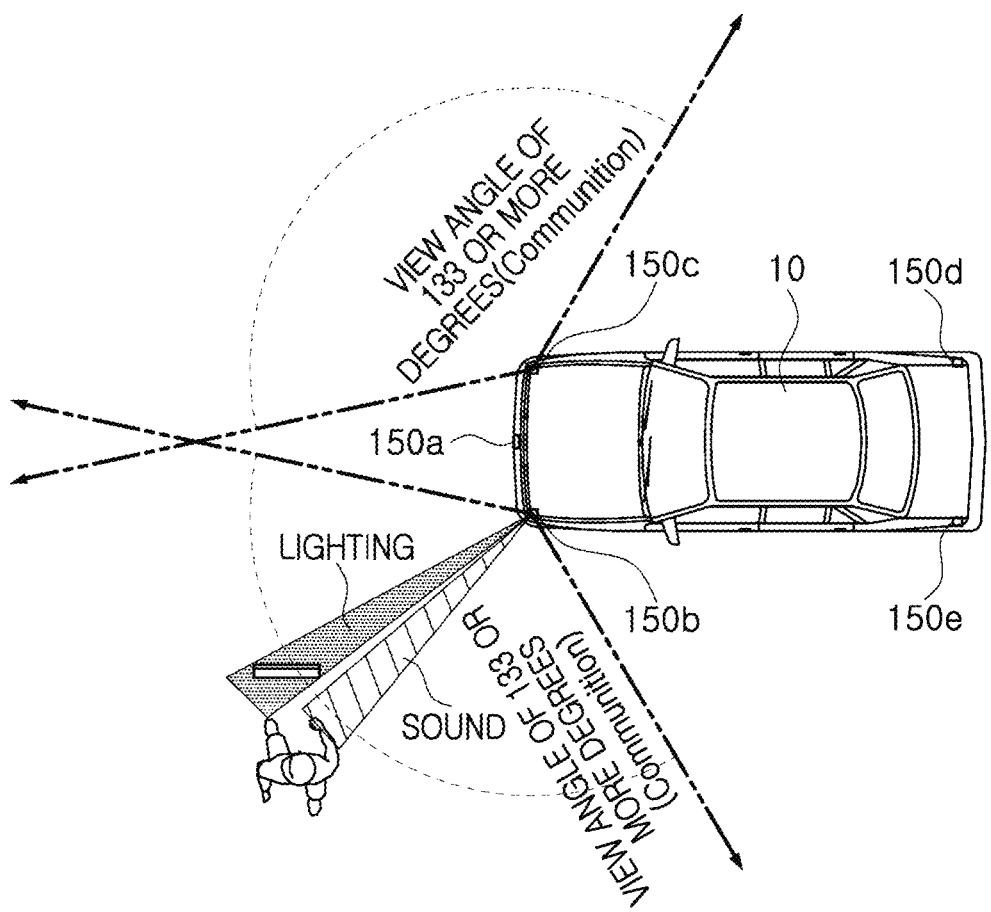
FIG. 2 is a view that is referred to for description of a position at which a communication content transfer unit according to the first embodiment of the present disclosure is installed.
Figure 3:
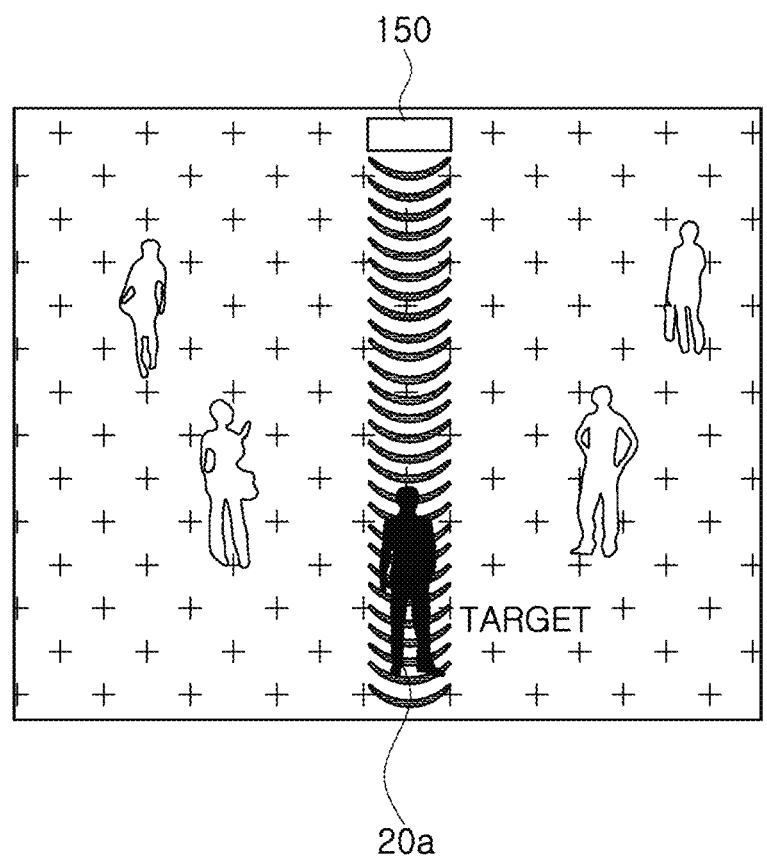
FIG. 3 is a view that is referred to for description of the directivity of the communication content transfer unit according to the first embodiment of the present disclosure.
Figure 4:
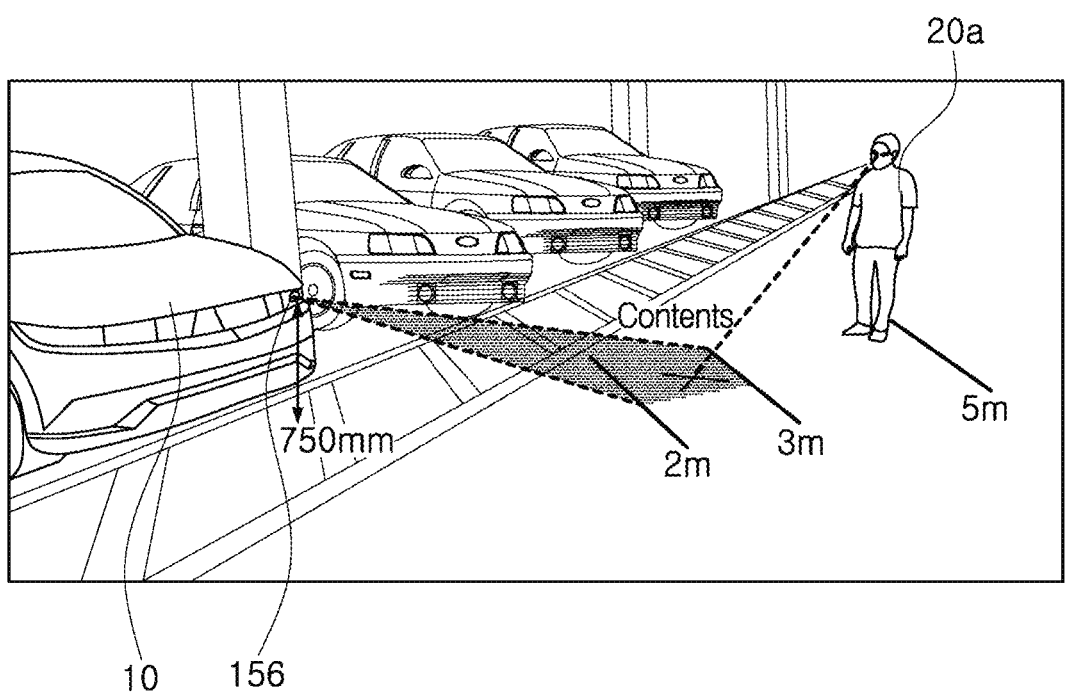
FIG. 4 is a view that is referred to for description of a lighting unit outputting guide information according to the first embodiment of the present disclosure.

FIG. 1 is a block diagram schematically illustrating an apparatus for transferring vehicle communication content according to the first embodiment of the present disclosure. FIG. 2 is a view that is referred to for description of a position at which a communication content transfer unit according to the first embodiment of the present disclosure is installed. FIG. 3 is a view that is referred to for description of the directivity of the communication content transfer unit according to the first embodiment of the present disclosure. FIG. 4 is a view that is referred to for description of a lighting unit outputting guide information according to the first embodiment of the present disclosure.

With reference to FIG. 1, the apparatus for transferring vehicle communication content according to the first embodiment of the present disclosure includes a communication unit 110, a surrounding-environment detection unit 120, a traveling-state detection unit 130, a controller 140, and a communication content transfer unit 150.

The communication unit 110 is configured to communicate with a nearby vehicle and may transmit and receive traveling state information of the nearby vehicle. At this point, the traveling state information of the nearby vehicle may include state information of the nearby vehicle (including traveling information, a traveling mode, a speed, and the like of the nearby vehicle) and surroundings recognition information (including road information, weather information, and the like). The communication unit 110, for example, may be a vehicle-to-everything (V2X) communication unit. V2X communication collectively refers to a technology of communicating with a vehicle 10 through all interfaces. Types of V2X communication include vehicle-to-vehicle communication, vehicle-to-infrastructure communication, and the like.

For example, the communication unit 110 may perform the V2X communication with a preceding/following vehicle in front of/behind the vehicle 10, a vehicle on an adjacent lane, and the like. The adjacent lanes are lanes to and from which the vehicle 10 is allowed to move and are positioned adjacent to both sides of a lane on which the vehicle 10 travels. Particularly, the communication unit 110 may receive the state information of the nearby vehicle and the like and may provide the received state information to the controller 140.

The surrounding-environment detection unit 120 may detect surrounding-environment information of the vehicle 10. That is, the surrounding-environment detection unit 120 may detect the surrounding-environment information of the vehicle 10 that includes surrounding-object information, ambient traffic information, sound information (noise), road information, weather information, and the like. At this point, the objects may include a vehicle, a road facility, a pedestrian, and the like. The surrounding-object information may include a speed of a nearby vehicle (preceding/following vehicle), a distance thereto, and the like. The ambient traffic information may include information on accident black spots and the like. The road information may include a type of road, a lane width, a high-accident-frequency road section, a falling-stone road section, a near-school road section, an abrupt environment-changing road section, and the like. The weather information may include rainfall, illumination intensity, temperature, and the like.

The surrounding-environment detection units 120 may include any devices, such as a camera, an ultrasonic sensor, a lidar sensor, a radar sensor, a meteorological sensor, an optical sensor, an acoustic sensor, and an illuminometer, that are capable of detecting the surrounding-environment information of the vehicle 10.

In addition, the surrounding-environment detection unit 120 may perform communication (for example, V2P communication, V3V communication, and the like) with transportation infrastructure facilities, other vehicles, a user's mobile terminal and the like in the vicinity of the vehicle 10 through the communication unit 110 and may detect the surrounding-environment information of the vehicle 10, additionally using information received therefrom.

According to the present disclosure, the surrounding-environment detection unit 120 may be separately configured to operate. Instead of the surrounding-environment detection unit 120, an object detection unit 152 provided in the communication content transfer unit 150 may be used.

The traveling-state detection unit 130 may detect a traveling state of the vehicle 10. That is, the traveling-state detection unit 130 may detect traveling mode switching, traveling-direction switching, traveling starting, traveling stopping, braking starting, brake operating and the like, which are performed by the vehicle 10, and backup driving of the vehicle 10, U-turning traveling, traveling for cutting in line, defensive traveling, and the like. The traveling state of the vehicle 10 may include the traveling mode switching, the traveling-direction switching, the backup driving, the braking, and the like. The traveling mode switching may be switching from a normal traveling mode to an autonomous traveling mode or switching from the autonomous traveling mode to the normal traveling mode. The traveling-direction switching may be switching to rightward-direction traveling or leftward-direction traveling.

The traveling-state detection unit 130 may detect backup driving of the vehicle 10 when a backup lamp is switched on. The traveling-state detection unit 130 may detect the vehicle 10's switching of the traveling direction when a turn signal is switched on. The traveling-state detection unit 130 may detect the vehicle 10's braking when a brake light is switched on. The traveling-state detection unit 130 may detect the vehicle 10's switching to the autonomous traveling mode through an autonomous traveling controller. In addition, the traveling-state detection unit 130 may detect the vehicle 10's forward driving or backup driving through a gear-shift step or the like. The traveling-state detection unit 130 may detect the vehicle 10's switching of the traveling direction through a rotational angle of a steering wheel or a wheel, a driver's operating of the steering wheel, lane detection, and the like. In addition, the traveling-state detection units 130 may include any devices, such as a camera, an ultrasonic sensor, a lidar sensor, a radar sensor, an IMU sensor, and a position measurement sensor (a GPS module), that are capable of detecting the traveling state of the vehicle 10.

The controller 140 may recognize a target object on the basis of the surrounding-environment information of the vehicle 10. The controller 140 may rotate the communication content transfer unit 150 in a manner that faces toward the target object, depending on whether or not communication content needs to be transferred to the recognized target object. The controller 140 may output the communication content including warning information or guide information through the communication content transfer unit 150. The communication content here may be content for alerting an object (a pedestrian, a two-wheeled vehicle, or the like) to the risk of an accident to the object in order to prevent the accident from occurring, in a situation where the vehicle 10 travels at a low speed or comes to a stop. The controller 140 may control the communication content transfer unit 150 in order to transfer purposive content to the object, considering the traveling state of the vehicle 10. The warning information may be information for alerting that a distance to the vehicle 10 is equal to or smaller than a present first distance. The guide information may be alerting information for urging the object to keep a lookout.

Operation of the controller 140 will be described in detail below.

The controller 140 may recognize the object on the basis of the surrounding-environment information of the vehicle 10 and may determine a type of the recognized object. At this point, the controller 140 may receive the surrounding-environment information of the vehicle 10 from the surrounding-environment detection unit 120 or the object detection unit 152 of the communication content transfer unit 150. When receiving the surrounding-environment information, the controller 140 may determine the type of the object using an object identification algorithm. The object identification algorithm may be a neural network model trained in such a manner as to detect the object from an image collected through the surrounding-environment detection unit 120 and to identify the type of the detected object. In addition, the controller 140 may determine the type of the object using various known technologies.

When the type of the object is determined, the controller 140 may recognize a distance to the vehicle 10 on the basis of the surrounding-environment information of the vehicle 10.

Thereafter, the controller 140 may determine on the basis of the type of the object and the distance thereto whether or not the communication content needs to be transferred to the object. At this point, in a case where the object needs to maintain a preset sight distance and is positioned at a predetermined distance or smaller, the controller 140 may determine that the communication content needs to be transferred to the object. At this point, the objects may include a lane, another vehicle, a two-wheeled vehicle, a pedestrian, a traffic light, a road, a structure, a speed bump, an obstacle on a road, an animal, and the like. An object that needs to maintain the sight distance may be an object that a driver has to brake to stop before or has to travel around, among objects, such as another vehicle, a pedestrian, a two-wheeled vehicle, and an animal, that are positioned in front of a traveling host vehicle.

In a case where the communication content needs to be transferred to the object, the controller 140 may rotate the communication content transfer unit 150 in such a manner as to face toward the object. That is, the controller 140 may rotate the communication content transfer unit 150 in such a manner as to be directed toward the object.

Thereafter, the controller 140 may output the communication content containing any one of the warning information and the guide information through the communication content transfer unit 150, according to the measured distance to the object. Specifically, in a case where the object approaches in a manner that is positioned at the preset first distance or smaller, the controller 140 may output the warning information through a speaker unit 154 of the communication content transfer unit 150. At this point, the controller 140 may output the warning information through the speaker unit 154 of the communication content transfer unit 150 that is installed in a direction toward the object. The outputting of the warning information through the speaker unit 154 makes the object (for example, a pedestrian) recognize that the vehicle 10 approaches. When the object recognizes the vehicle 10, the controller 140 may determine whether or not the object approaches in a manner that is positioned at a preset second distance or smaller. At this point, the preset second distance may be smaller than the preset first distance. For example, the preset first distance may be 10 m, and the preset second distance may be 5 m. When the object approaches in a manner that is positioned at the preset second distance or smaller, the controller 140 may stop the vehicle 10 and may output the communication content containing the guide information through the communication content transfer unit 150. At this point, the controller 140 may output the guide information using one or more of a symbol, an icon, an image, a letter, and sound. The guide information may be information for urging the object (for example, a pedestrian, a guide-target vehicle, a two-wheeled vehicle, or the like) to keep a lookout. Therefore, the controller 140 may output information in a direction (that is, a direction toward the object) in which the object (for example, a pedestrian, a guide-target vehicle, a two-wheeled vehicle, or the like) can pretty well see the guide information. When the object, as illustrated in FIG. 2, is positioned in front of the vehicle 10, the controller 140 may output the guide information through the communication content transfer unit 150 installed on the front side of the vehicle 10. When the object is positioned to the right of the vehicle 10, the controller 140 may output the guide information through the communication content transfer unit 150 installed on the right side of a vehicle body. When the object is positioned behind the vehicle 10, the controller 140 may output the guide information through the communication content transfer unit 150 installed on the rear side of a vehicle body.

In a case where the communication content containing the guide information is output and thus where the object is positioned at greater than a preset threatening approach distance from the vehicle 10, the controller 140 may perform control in such a manner that the vehicle 10 starts to travel.

In addition, considering the surrounding-environment information detected by the surrounding-environment detection unit 120, the controller 140 may adjust a sound volume of the speaker unit 154 of the communication content transfer unit 150 and may adjust light intensity and an angle of each light source provided in a lighting unit 156. At this point, the sound volume of the speaker unit 154 and the light intensity of the light source may be adjusted by controlling a value of electric current. For example, the controller 140 may adjust the sound volume of the speaker unit 154, considering ambient noise (sound), a distance between the vehicle 10 and a target object, the number of target objects, and the like. At this time, in a case where a level of the ambient noise (sound) is lower than a reference sound level, the controller 140 may adjust the sound volume of the speaker unit 154 in a manner that is lower than a reference sound volume. In addition, in a case where a level of the ambient noise (sound) is higher than the reference sound level, the controller 140 may adjust the sound volume of the speaker unit 154 in a manner that is higher than the reference sound volume. In addition, the controller 140 may adjust light intensity or an emission angle of the lighting unit 156, considering ambient illumination intensity, a distance between the vehicle 10 and a target object, the number of target objects, and the like. At this time, in a case where the ambient illumination intensity is lower than the reference illumination intensity, the controller 140 may adjust the light intensity of the light source provided in the lighting unit 156 in a manner that is lower than reference light intensity. In addition, in a case where the ambient illumination intensity is higher than the reference illumination intensity, the controller 140 may adjust the light intensity of the light source provided in the lighting unit 156 in a manner that is higher than the reference light intensity. In addition, the controller 140 may adjust the light intensity of the lighting unit 156, considering the weather information.

The communication content transfer unit 150 may be provided on at least one of the front side, rear side, and lateral side of the vehicle 10 and may output sound or light. For example, the communication content transfer unit 150, as illustrated in FIG. 2, may be installed each of the center 150a, the left end 150b, and the right end 150c of the front side of the vehicle 10 and each of the left end 150d and the right end 150e of the rear side of the vehicle 10. Under the control of the controller 140, each of the communication content transfer units 150 may be driven independently of each other and may output sound or light.

Under the control of the controller 140, the communication content transfer unit 150 is possibly rotated and may be rotated in such a manner as to face toward the target object. That is, the communication content transfer unit 150 may be rotated in such a manner as to be directed toward the target object and thus may transfer the communication content to the target object. For example, as illustrated in FIG. 3, although a plurality of objects is detected in the vicinity of the vehicle 10, the communication content transfer unit 150 may transfer the communication content to only a target object 20a to which the communication content needs to be transferred.

The communication content transfer unit 150 may include the object detection unit 152, the speaker unit 154, and the lighting unit 156.

The object detection unit 152 may detect the surrounding-object information and may provide a result of the detection to the controller 140. At this point, the objects here may include a vehicle, a road facility, a pedestrian, and the like, and the surrounding-object information may include a speed of a nearby vehicle (preceding/following vehicle), a distance thereto, a position of a pedestrian, a distance thereto, and the like.

Under the control of the controller 140, the object detection unit 152 may follow the target object.

The speaker unit 154 may output the communication content in the form of a sound wave. At this point, under the control of the controller 140, the speaker unit 154 may output sound corresponding to the communication content. The speaker unit 154 may be realized as a directional speaker that uses un ultrasonic wave technique. The directional speaker may be a special-purpose speaker that modulates a sound signal onto a carrier ultrasonic wave and may transfer only in a target direction in a specific area.

In addition, under the control of the controller 140, the speaker unit 154 may adjust a sound volume.

The lighting unit 156 may output the communication content in the form of light.

The lighting unit 156 may include a plurality of light sources. Under the control of the controller 140, the lighting unit 156 may be turned on or flicker, thereby emitting the light corresponding to the communication content to a road surface. At this point, a light emitting diode may be used as each light source. The light source is not limited to the light emitting diode. For example, the lighting unit 156 may be configured with at least one LED. Depending on a lighting function, the LED may be turned on or flicker to emit light of a specific color, such as blue, green, yellow, or red. The LEDs may operate individually in such a manner as to emit light in a progressive manner to the road surface facing toward the target object.

The lighting unit 156 may display the communication content containing the guide information, in various light patterns and in a combination of colors.

For example, the lighting unit 156, as illustrated in FIG. 4, may display information for urging the target object 20a to keep a lookout, in a direction toward the target object 20a, using a letter, a symbol, and the like. Accordingly, through the lighting unit 156, the target object 20a may easily recognize what to keep a lookout for and may be prepared to protect against an accident.

In addition, the lighting unit 156 may adjust an angle at which to emit light, according to a road environment, such as a type of road, a lane width, or a position of the object.

In addition, the brightness of the lighting unit 156 may be determined, considering an ambient environment, such as ambient lighting. At this point, the lighting unit 156 may have high illuminance in such a manner as to provide sufficient visibility. Thus, the pattern of the road surface is distinguishable from a neighboring road surface. A road, that is, a road surface, has a maximum illuminance of approximately 100 lux with reference to a standard illuminance of an underground parking lot or a street lamp. In this situation, it is desirable that the lighting unit 156, for example, has an illuminance of at least 200 lux in order to provide sufficient visibility in such a manner that the pattern of the road surface is distinguishable from a neighboring road surface.

The communication content transfer unit 150, configured as described above, may transfer video content and audio content to the target object at the same time by integrally installing a lighting projector for emitting light to the road surface, and a directional speaker, which uses an ultrasonic wave technique, on the exterior side of the vehicle 10. That is, the communication content transfer unit 150 is rotated toward the target object, and outputs the warning information through the speaker unit 154 directed toward the target object. When it is ensured that the target object recognizes the vehicle 10, the communication content transfer unit 150 may output the warning information and the guide information through the lighting unit 156 emitting light to the road surface or through a vehicle-body lighting system.

Figure 5:
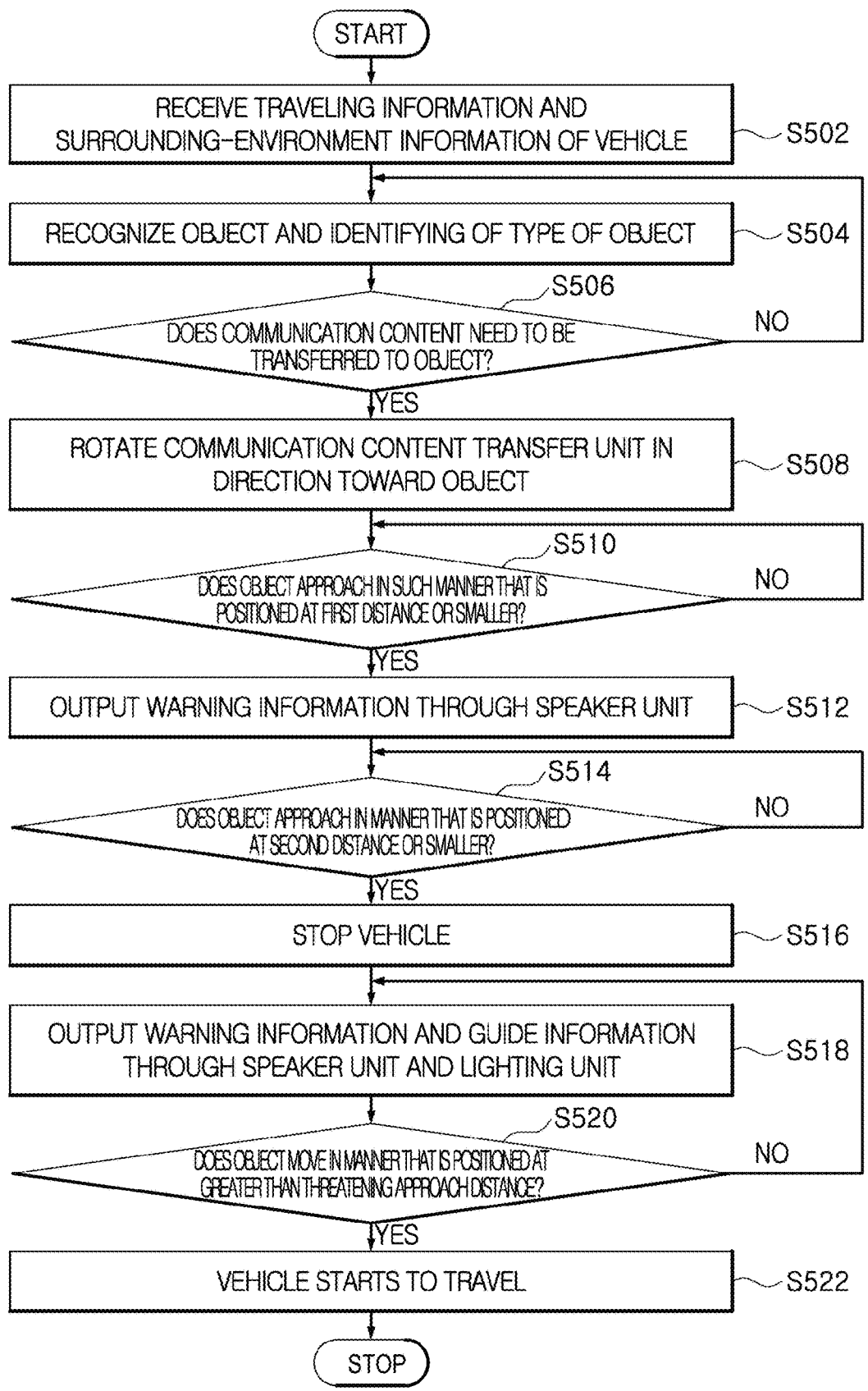
FIG. 5 is a flowchart that is referred to for description of a method of transferring vehicle communication content according to a second embodiment of the present disclosure.

FIG. 5 is a flowchart that is referred to for description of a method of transferring vehicle communication content according to the second embodiment of the present disclosure.

With reference to FIG. 5, when receiving the surrounding-environment information and the traveling state of the vehicle 10 (S502), the controller 140 recognizes an object on the basis of the surrounding-environment information of the vehicle 10 and identifies a type of the recognized object (S504). At this point, the controller 140 may determine the type of the object using the object identification algorithm.

When Step S504 is performed, the controller 140 determines whether or not the communication content needs to be transferred to the recognized object (S506). At this point, in a case where the object needs to maintain a preset sight distance and is positioned at a predetermined distance or smaller from the vehicle 10, the controller 140 may determine that the communication content needs to be transferred to the object.

When the result of the determination in Step S506 is that the communication content needs to be transferred to the object, the controller 140 rotates the corresponding communication content transfer unit 150 in a direction toward the object (S508). That is, when the communication content needs to be transferred to the object, the controller 140 may rotate the corresponding communication content transfer unit 150 in such a manner as to face toward the object.

When Step S508 is performed and then the object approaches in a manner that is positioned at the preset first distance or smaller (S510), the controller 140 outputs the warning information through the speaker unit 154 of the communication content transfer unit 150 (S512). The outputting of the warning information through the speaker unit 154 makes it possible for the object (for example, a pedestrian) to recognize that the vehicle 10 approaches.

Thereafter, when the object approaches in a manner that is positioned at a preset second distance or smaller (S514), the controller 140 stops the vehicle 10 (S516) and outputs the communication content containing the guide information through the speaker unit 154 and the lighting unit 156 (S518). At this time, the controller 140 may output the guide information for urging the object to keep a lookout, through the speaker unit 154 and the lighting unit 156.

When Step S518 is performed and then the object moves in a manner that is positioned at greater than the preset threatening approach distance (S520), the controller 140 performs control in such a manner that the vehicle 10 starts to travel (S522).

When the object does not move in a manner that is positioned at greater than the preset threatening approach distance, the controller 140 may perform Step S518.

As described above, in the apparatus for and the method of transferring vehicle communication content according to the first and second embodiments, respectively, of the present disclosure, direct communication with a communication-target object is possible through an integrated module in which a directional sound function and a lighting function are combined. Thus, in a situation where a vehicle travels at a low speed or comes to a stop, the risk of an accident due to a collision with a pedestrian or a two-wheeled vehicle can be prevented.

In addition, in the apparatus for and the method of transferring vehicle communication content according to the first and second embodiments, respectively, of the present disclosure, an actuator is provided in an integrated module in which the directional sound function and the lighting function are combined, and thus the integrated module is rotated in such a manner as to face toward a communication-target object. Accordingly, information, such as communication content, is transferred, considering a movement of a target object and a direction of gaze thereof (recognized by a camera. Thus, the product's marketability can be enhanced, and the product's visual recognizability can be improved.

The embodiments of the present disclosure are described only in an exemplary manner with reference to the drawings. It will be understandable to a person of ordinary skill in the art to which the present disclosure pertains that various other modifications and equivalents are possible from this description. Therefore, the legitimate technical scope of the present disclosure should be defined by the following claims.

What is claimed is:

1. An apparatus for transferring vehicle communication content, the apparatus comprising:
   a surrounding-environment detection unit configured to detect surrounding-environment information of a vehicle;
   a communication content transfer unit provided on at least one of a front side, a rear side, and a lateral side of the vehicle and configured to output sound or light; and
   a controller configured to recognize an object based on the surrounding-environment information of the vehicle, to rotate the communication content transfer unit in a direction toward the object, depending on whether communication content needs to be transferred to the recognized object, and to output the communication content containing warning information or guide information through the communication content transfer unit;
   wherein when the object is positioned at less than or equal to a preset first distance, based on the surrounding-environment information of the vehicle, the controller is adapted to output the warning information for alerting that a distance to the vehicle is equal to or less than the preset first distance, through a speaker unit of the communication content transfer unit,
   wherein when the object is positioned at less than or equal to a preset second distance, based on the surrounding-environment information of the vehicle, the controller is adapted to stop the vehicle and output the guide information for urging the object to keep a lookout, through the speaker unit and a lighting unit of the communication content transfer unit, and
   wherein when the object is positioned at greater than or equal to a preset threatening approach distance, based on the surrounding-environment information of the vehicle, the controller is adapted to perform control such that the vehicle starts to travel.

2. The apparatus of claim 1, wherein the communication content transfer unit comprises:
   an object detection unit configured to identify a type of the object;
   the speaker unit configured to output the communication content as a sound wave; and the lighting unit configured to output the communication content as light.

3. The apparatus of claim 2, wherein the object detection unit is configured to identify the type of the object and, under the control of the controller, follow the object.

4. The apparatus of claim 2, wherein the speaker unit is a directional speaker adapted to use an ultrasonic wave technique and, under the control of the controller, output sound corresponding to the communication content.

5. The apparatus of claim 2, wherein the lighting unit includes a plurality of light sources and is configured to turn on or flicker under the control of the controller, to emit the light corresponding to the communication content to a road surface.

6. The apparatus of claim 2, wherein the communication content transfer unit is rotatable and, under the control of the controller, is adapted to be rotated to face the object, and
wherein the communication content transfer unit is one of a plurality of communication content transfer units, and each of the plurality of communication content transfer units is driven independently under the control of the controller and outputs sound or light.

7. The apparatus of claim 2, wherein the surrounding-environment information of the vehicle includes at least one of ambient lighting, noise, weather information, a type of road, a lane width, a position of a surrounding object, a distance thereto, and a speed thereof, and
wherein the controller is adapted to adjust a sound volume of the speaker unit and light intensity or an angle of each light source provided in the lighting unit, based on the surrounding-environment information of the vehicle.

8. The apparatus of claim 1, wherein the controller is adapted to determine based on a type of the object and a distance thereto whether the communication content needs to be transferred to the object, and
when the object is an object that needs to maintain a preset sight distance and the object is positioned at less than or equal to a predetermined distance, the controller is adapted to determine that the communication content needs to be transferred to the object.

9. A method of transferring vehicle communication content, the method comprising:
receiving, by a controller, surrounding-environment information of a vehicle;
recognizing, by the controller, an object based on the surrounding-environment information of the vehicle and determining, by the controller, whether communication content needs to be transferred to the recognized object; and
rotating, by the controller, a communication content transfer unit in a direction toward the object when the communication content needs to be transferred to the object and outputting, by the controller, the communication content containing warning information or guide information through the communication content transfer unit;
wherein in the outputting step, when the object is positioned at less than or equal to a preset first distance, based on the surrounding-environment information of the vehicle, the controller outputs the warning information for alerting that a distance to the vehicle is equal to or less than the preset first distance, through a speaker unit of the communication content transfer unit,
when the object is positioned at less than or equal to a preset second distance, based on the surrounding-environment information of the vehicle, the controller stops the vehicle and outputs the guide information for urging the object to keep a lookout, through the speaker unit and a lighting unit of the communication content transfer unit, and
when the object is positioned at greater than or equal to a preset threatening approach distance, based on the surrounding-environment information of the vehicle, the controller performs control such that the vehicle starts to travel.

10. The method of claim 9, wherein the controller determines that the communication content needs to be transferred to the object when the object is an object that needs to maintain a preset sight distance and is positioned at a predetermined distance or smaller.

11. The method of claim 9, wherein in the outputting step, the controller adjusts a sound volume of the speaker unit and light intensity or an angle of each light source provided in the lighting unit, based on the surrounding-environment information including at least one of ambient lighting, noise, weather information, a type of road, a lane width, a position of a surrounding object, a distance thereto, and a speed thereof.

12. An apparatus for transferring vehicle communication content, the apparatus comprising:
a surrounding-environment detection unit configured to detect surrounding-environment information of a vehicle, the surrounding-environment information including weather information and sound information of an environment surrounding the vehicle;
a communication content transfer unit provided on at least one of a front side, a rear side, and a lateral side of the vehicle and configured to output sound or light; and
a controller configured to recognize an object based on the surrounding-environment information of the vehicle, to rotate the communication content transfer unit in a direction toward the object, depending on whether communication content needs to be transferred to the recognized object, and to output, according to the weather information and the sound information, the communication content containing warning information or guide information through the communication content transfer unit.

* * * * *